US009014930B2

(12) United States Patent
Kurosaki

(10) Patent No.: US 9,014,930 B2
(45) Date of Patent: Apr. 21, 2015

(54) VEHICLE BRAKE CONTROL SYSTEM

(71) Applicant: Nissin Kogyo Co., Ltd., Ueda, Nagano (JP)

(72) Inventor: Takashi Kurosaki, Nagano (JP)

(73) Assignee: Nissin Kogyo Co., Ltd., Nagano (JP)

(*) Notice: Subject to any disclaimer, the term of this patent is extended or adjusted under 35 U.S.C. 154(b) by 0 days.

(21) Appl. No.: 14/068,654

(22) Filed: Oct. 31, 2013

(65) Prior Publication Data

US 2014/0121915 A1 May 1, 2014

(30) Foreign Application Priority Data

Nov. 1, 2012 (JP) .................................. 2012-241719

(51) Int. Cl.
*B60T 7/12* (2006.01)
*B60W 30/18* (2012.01)
*B60T 13/14* (2006.01)

(52) U.S. Cl.
CPC .......... *B60T 7/122* (2013.01); *B60W 30/18118* (2013.01); *B60T 2201/06* (2013.01); *B60T 13/146* (2013.01)

(58) Field of Classification Search
USPC ................................. 701/53, 67, 68; 303/154
See application file for complete search history.

(56) References Cited

U.S. PATENT DOCUMENTS

| | | | |
|---|---|---|---|
| 6,814,414 B1* | 11/2004 | Schmitt et al. ................. | 303/191 |
| 8,660,765 B2 | 2/2014 | Tomura et al. | |
| 2003/0227215 A1* | 12/2003 | Kinder et al. ..................... | 303/3 |
| 2006/0106520 A1 | 5/2006 | Bodin et al. | |
| 2006/0229771 A1* | 10/2006 | Messner et al. ................... | 701/1 |
| 2008/0153669 A1 | 6/2008 | Peterson | |
| 2010/0217493 A1 | 8/2010 | Tomura et al. | |
| 2010/0262329 A1 | 10/2010 | Monti et al. | |

FOREIGN PATENT DOCUMENTS

| | | |
|---|---|---|
| FR | 2918472 A1 | 1/2009 |
| JP | 3081757 B2 | 6/1995 |
| JP | H07040332 | 7/1995 |

(Continued)

OTHER PUBLICATIONS

European Search Report for related Application No. 13191056.4-1756 dated Jan. 7, 2014, 6 pages.

(Continued)

*Primary Examiner* — Mary Cheung
*Assistant Examiner* — Rodney Butler
(74) *Attorney, Agent, or Firm* — Andrew M. Calderon; Roberts Mlotkowski Safran & Cole, P.C.

(57) ABSTRACT

A vehicle brake control system includes a clutch stroke acquiring section, a braking force holding section, a first release determination section, and a release execution section. The clutch stroke acquiring section acquires a clutch stroke. The braking force holding section holds a braking force imparted to a wheel brake of a vehicle being at a halt. The first release determination section includes a peak value holding part and a returned amount calculator. The peak value holding part holds a peak value of the clutch stroke. The returned amount calculator calculates a returned amount by which a clutch is returned from the peak value. The first release determination section determines whether or not the held braking force should be released, based on the calculated returned amount. If the first release determination section determines that the held braking force should be released, the release execution section releases the held braking force.

20 Claims, 11 Drawing Sheets

(56) References Cited

FOREIGN PATENT DOCUMENTS

| | | |
|---|---|---|
| JP | 2005247193 | 9/2005 |
| JP | 2003072532 | 1/2009 |
| JP | 2010116160 | 5/2010 |
| JP | 2010196767 | 9/2010 |

OTHER PUBLICATIONS

Japanese Office Action for related Application No. 2012-241719 dated Oct. 28, 2014, 6 pages.

* cited by examiner

VEHICLE BRAKE CONTROL SYSTEM

CROSS REFERENCE TO RELATED APPLICATION

This application is based on and claims priority under 35 U.S.C. §119 to Japanese Patent Application No. 2012-241719 (filed on Nov. 1, 2012), the entire contents of which are incorporated herein by reference.

BACKGROUND

1. Field

The invention relates to a vehicle brake control system that executes an automatic vehicle hold (AVH) control in a vehicle equipped with a manual transmission.

2. Related Art

The AVH control in a motor vehicle is designed to hold a braking force so as to prevent movement of the vehicle even if a driver removes his/her foot from a brake pedal while the vehicle is at a halt. Then, the braking force so held is released when the driver attempts to start the vehicle.

In a motor vehicle equipped with a manual transmission, the holding of the braking force is released in response to an operation of a clutch triggered by depression of a clutch pedal by the driver. Japanese Patent No. 3081757 describes detecting a depression amount (a stroke) of a clutch pedal by a sensor and releasing holding of a braking force when the stroke detected by the sensor becomes equal to or smaller than a predetermined stroke.

SUMMARY

However, a clutch engaging position differs depending upon whether the clutch is new or wears down. Therefore, in a case where the holding of a braking force is released when a stroke sensed by a stroke sensor becomes equal to or smaller than a predetermined stroke, the predetermined stroke which constitutes a threshold value needs to vary in accordance with a wear condition of the clutch.

Then, one embodiment of the invention provides a vehicle brake control system that can release holding of a braking force in an AVH control without changing a setting in accordance with a wear condition of a clutch.

(1) According to one embodiment of the invention, a vehicle brake control system includes a stroke acquiring section, a braking force holding section, a first release determination section, and a release execution section. The stroke acquiring section acquires a clutch stroke of a vehicle. The braking force holding section holds a braking force imparted to a wheel brake of the vehicle which is at a halt. The first release determination section includes a peak value holding part and a returned amount calculator. The peak value holding part holds a peak value of the clutch stroke acquired by the stroke acquiring section. The returned amount calculator calculates a returned amount by which a clutch is returned from the peak value of the clutch stroke. The first release determination section determines as to whether or not the braking force held by the braking force holding section should be released, based on the returned amount. The release execution section releases the braking force held by the braking force holding section on condition that the first release determination section determines that the holding of the braking force should be released.

With the configuration of (1), the first release determination section determines as to whether or not the held braking force should be released, based on the returned amount by which the clutch is returned from the peak value. Therefore, it is possible to release the braking force held during the AVH control without changing a setting in accordance with the wear condition of the clutch.

(2) In the vehicle brake control system of (1), if a time during which the returned amount exceeds a first threshold value exceeds a second threshold value, the first release determination section may determine the held braking force should be released.

With the configuration of (2), if the clutch pedal is returned by a returned amount exceeding the first threshold value and if a time during which the clutch pedal is returned in that way exceeds the second threshold value, it is possible to determine in an almost ensured fashion that the driver performs an operation to engage the clutch.

(3) In the vehicle brake control system of (2), if the peak value of the clutch pedal is larger than a predetermined value, the first threshold value may be set to be larger than that for a case where the peak value of the clutch stroke is equal to or smaller than the predetermined value.

There is a tendency that if the driver depresses the clutch pedal substantially fully, then, the driver cannot hold the clutch pedal in such a substantially fully depressed state and returns the clutch pedal somewhat even if the driver has no intention to engage the clutch. If the peak value of the clutch stroke is larger than the predetermined value, the first threshold value setting is set to be larger than that for the case where the peak value of the clutch stroke is equal to or smaller than the predetermined value. Thereby, it is possible to reduce a possibility that the held braking force is erroneously released if the clutch pedal is slightly returned after the clutch pedal has been depressed substantially fully.

(4) The vehicle brake control system of any one of (1) to (3) may further include a second release determination section and an inclination angle acquiring section. The second release determination section determines as to whether or not the braking force held by the braking force holding section based on a difference between an actual engine revolution speed and an engine revolution speed in a non-load state which is estimated in accordance with a throttle position. If the difference exceeds a predetermined release reference value, the second release determination section determines that the held braking force should be released. The inclination angle acquiring section acquires an inclination angle of a road surface. If the release execution section determines based on the inclination angle acquired by the inclination angle acquiring section that the vehicle is about to start on an uphill road and if both of the first release determination section and the second release determination section determine that the held braking force should be released, the release execution section releases the held braking force. If the release execution section determines based on the acquired inclination angle that the vehicle is about to start on a flat road or a downhill road and if the first release determination section determines that the held braking force should be released, the release execution section releases the held braking force.

When starting the vehicle on the uphill road, it is general practice that the driver engages the clutch while depressing the accelerator. However, when starting the vehicle on the flat road or the downhill, some of the drivers engage the clutch without depressing the accelerator. Then, in the case of the uphill road, it is possible to release the held braking force at a more appropriate timing by releasing the held braking force if the first release determination section determines based on the operation of the clutch pedal that the held braking force should be released and if the second release determination section determines based on the throttle position that the held braking force should be released. On the other hand, in the case of the flat road or the downhill, the held braking force is released when the first release determination determines that the held braking force should be released irrespective of the determination result made by the second release determination section. Therefore, it is possible to release the held braking force at an appropriate timing even on the flat road or the downhill where some drivers tend to engage the clutch without depressing the accelerator.

(5) The vehicle brake control system of (4) may further include a shift position acquiring section. The shift position acquiring section acquires information as to whether a gear shift is in any of forward gear positions or a reverse gear position. If the information acquired by the shift position acquiring section indicates that the gear shift is in any of the forward gear positions, (i) the release execution section sets a third threshold value to one inclination angle which deviates towards a rearward tilting side from a horizontal position and (ii) if the inclination angle acquired by the inclination angle acquiring section is on a forward tilting side with respect to the third threshold value, the release execution section determines that the vehicle is about to start on the flat road or the downhill road. If the acquired information indicates that the gear shift is in the reverse gear position, (i) the release execution section sets the third threshold value to another inclination angle which deviates toward a forward tilting side with respect to the horizontal position and (ii) if the acquired inclination angle is on a rearward tilting side with respect to the third threshold value, the release execution section determines that the vehicle is about to start on the flat road or the downhill road.

With the configuration of (5), if it is determined that the gear shift is in any of the forward gears, (i) the release execution section sets the third threshold value to the one inclination angle which deviates towards the rear inclination side from the horizontal position and (ii) if the inclination angle acquired by the inclination acquiring section is on the forward tilting side with respect to the third threshold value, the release execution section determines that the vehicle is about to start on the flat road or the downhill road. Therefore, even if there is an error in the inclination angle acquired by the inclination angle acquiring section, it is possible to determine in an ensured fashion that the vehicle is about to start on the flat road when the vehicle is on the flat road in reality. Also, if it is determined that the gear shift is in the reverse gear, (i) the release execution section sets the third threshold value to the other inclination angle which deviates towards the front inclination side from the horizontal position and (ii) if the inclination angle acquired by the inclination acquiring section is on the rearward tilting side with respect to the third threshold value, the release execution section determines that the vehicle is about to start on the flat road or the downhill road. Therefore, even if there is an error in the inclination angle acquired by the inclination angle acquiring section, it is possible to determine in an ensured fashion that the vehicle is about to start on the flat road when the vehicle is on the flat road in reality.

According to the invention, it is determined as to whether or not the held braking force should be released, based on the returned amount by which the clutch is returned from the peak value. Thereby, the held braking force can be released during the AVH control without a setting being changed in accordance with a wear condition of the clutch.

DETAILED DESCRIPTION

Figure 1:
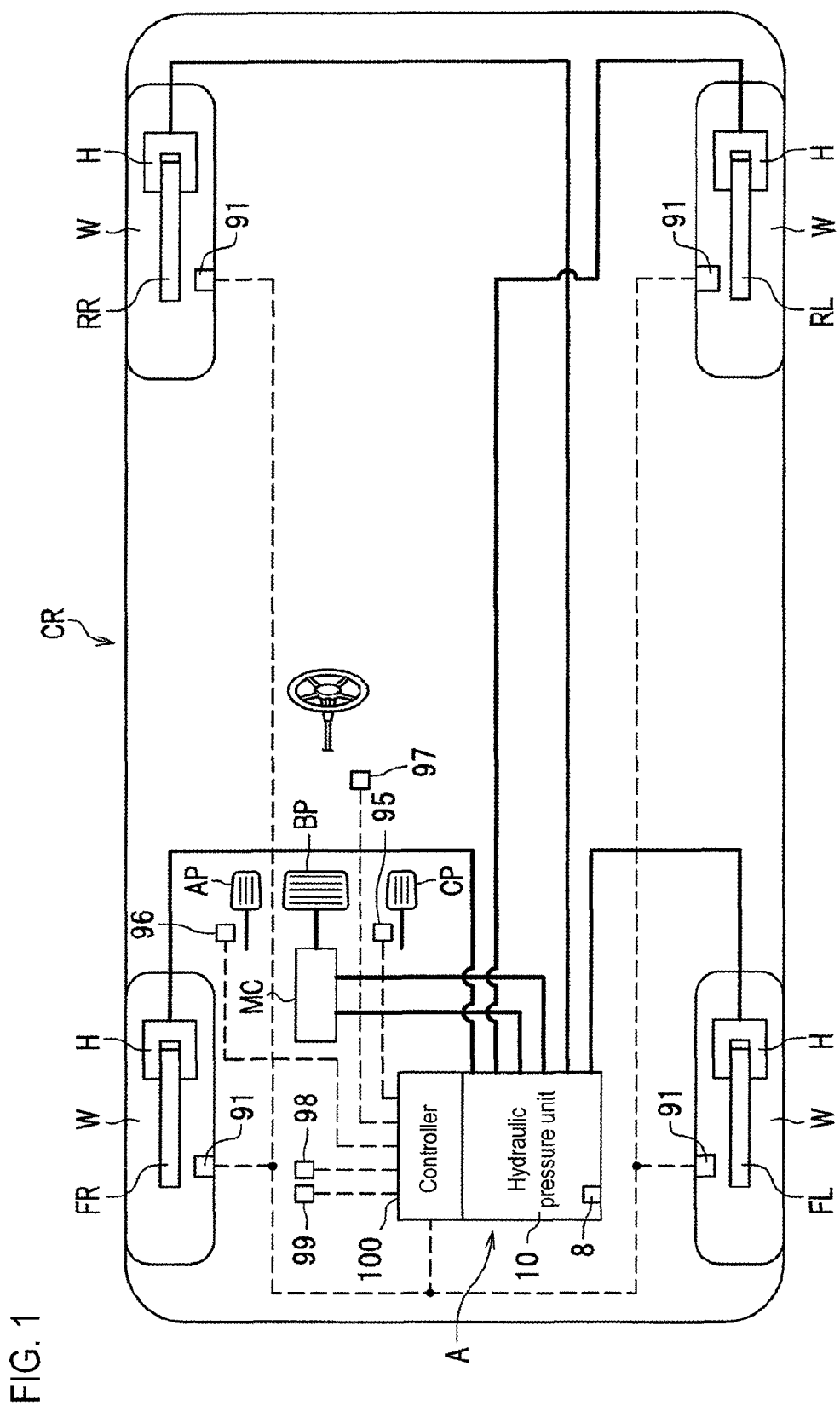
FIG. 1 is a block diagram of a vehicle that is equipped with a vehicle brake control system according to an embodiment of the invention.

Next, embodiments of the invention will be described in detail with reference to the accompanying drawings. As shown in FIG. 1, a vehicle brake control system A is designed to control braking forces (brake hydraulic pressures) which are imparted to wheels W of a vehicle CR as required. The vehicle brake control system A mainly includes a hydraulic pressure unit 10 and a controller 100. In the hydraulic pressure unit 10, fluid lines (hydraulic pressure lines) and various components are provided. The controller 100 controls the various components in the hydraulic pressure unit 10 as required.

The vehicle CR includes wheel speed sensors 91, a clutch stroke sensor 95, an accelerator sensor 96, a shift position sensor 97, an acceleration sensor 98, and an engine revolution speed sensor 99. The wheel speed sensors 91 detect rotation speeds of the wheels W. The clutch stroke sensor 95 detects a stroke of a clutch pedal CP. The accelerator sensor 96 detects an operation amount of an accelerator AP, that is, a throttle position. The acceleration sensor 98 detects an acceleration in a front-to-rear direction. Signals from the respective sensors are output to the controller 100.

The controller 100 includes, for example, a CPU, a RAM, a ROM and an input/output circuit and controls the various components by executing arithmetic operations based on inputs from the sensors and programs and data that are stored in the ROM.

Wheel cylinders H are hydraulic pressure devices that convert a brake hydraulic pressure which is generated by a master cylinder MC and the vehicle brake control system A into mechanical forces acting on wheel brakes FR, FL, RR, RL that are provided in the respective wheels W. The respective wheel cylinders H are connected to the hydraulic pressure unit 10 of the vehicle brake control system A via piping.

Figure 2:
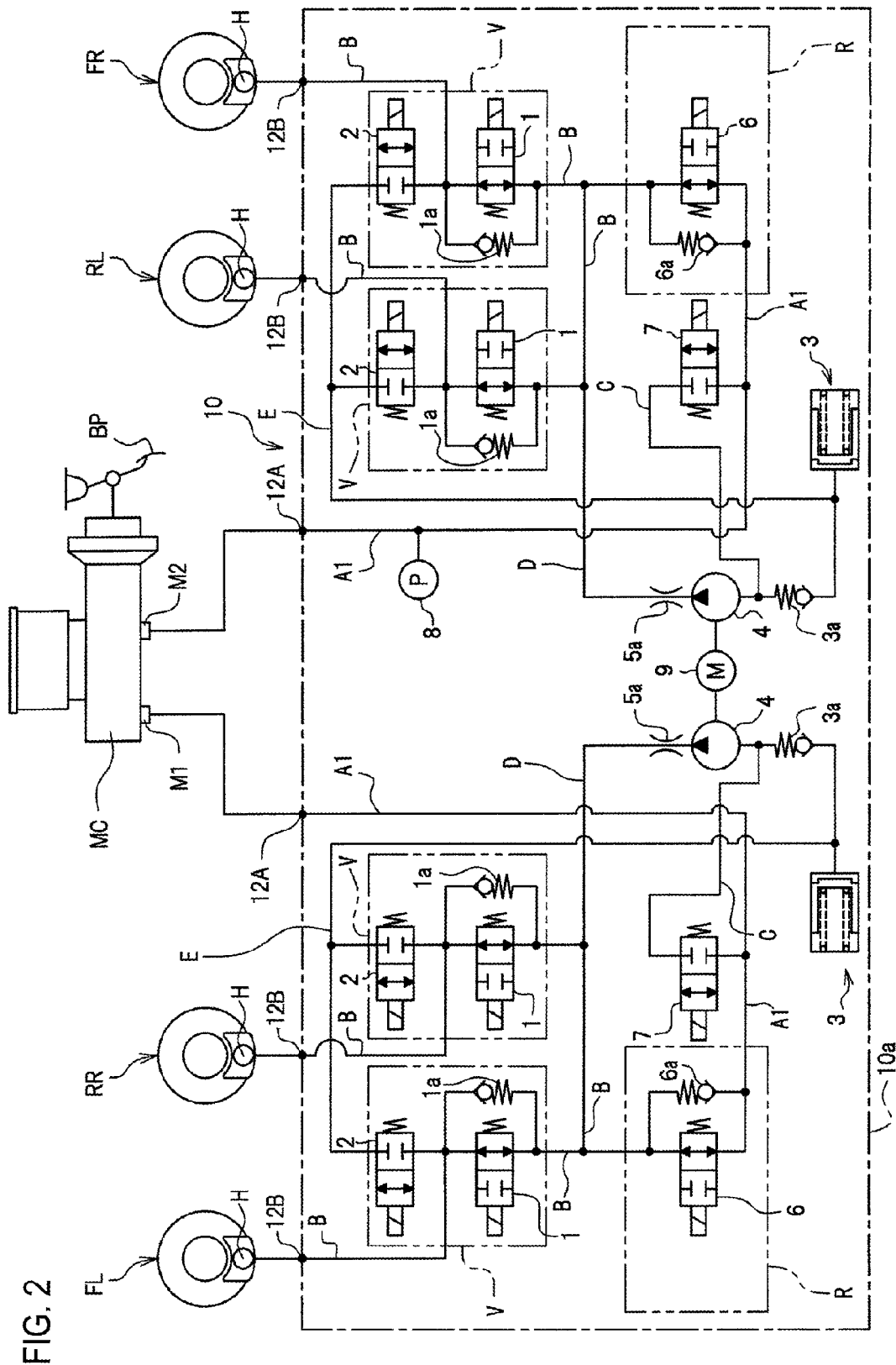
FIG. 2 is a block diagram of a hydraulic pressure unit of the vehicle brake control system.

As shown in FIG. 2, the hydraulic pressure unit 10 is disposed between the master cylinder MC and the wheel brakes FR, FL, RR, RL. The master cylinder MC is a hydraulic pressure source that generates a brake hydraulic pressure in accordance with an depression effort applied to the brake pedal BP. The hydraulic pressure unit 10 includes a pump body 10*a*, a plurality of inlet valves 1, a plurality of outlet valves 2, and the like. The pump body 10*a* is a base body having fluid lines through which a brake fluid flows. The inlet valves 1 and the outlet valves 2 are disposed on the fluid lines.

Two output ports M1, M2 of the master cylinder MC are connected to inlet ports 12A of the pump body 10*a*, respectively. Outlet ports 12B of the pump body 10*a* are connected to the wheel brakes FL, RR, RL, FR, respectively. Normally, fluid lines are established so as to communicate from the inlet ports 12A to the outlet ports 12B in the pump body 10*a*. Thereby, a depression effort applied to the brake pedal BP is transmitted to the wheel brakes FL, RR, RL, FR.

A fluid line starting from the output port M1 communicates with the front left wheel brake FL and the rear right wheel brake RR. Also, a fluid line starting from the output port M2 communicates with the front right wheel brake FR and the rear left wheel brake RL. It is noted that in the following description, the fluid line starting from the output port M1 is referred to as a "first system" and the fluid line starting from the output port M2 is referred to as a "second system."

In the first system of the hydraulic pressure unit 10, two control valve units V are provided for the wheel brakes FL, RR. Similarly, in the second system, two control valve units V are provided for the wheel brakes RL, FR. Also, in the hydraulic pressure unit 10, a reservoir 3, a pump 4, an orifice 5*a*, a pressure regulator (regulator) R and a suction valve 7 are provided for each of the first and second systems. Further, in the hydraulic pressure unit 10, a common motor 9 is provided for driving the pump 4 in the first system and the pump 4 in the second system. This motor 9 is a motor whose revolution speed is controllable. Also, in this embodiment, a pressure sensor 8 that is an example of a master cylinder pressure sensor is provided only in the second system.

It is noted that in the following description, fluid lines which start from the output ports M1, M2 of the master cylinder MC and reach the corresponding pressure regulators R are referred to as "output hydraulic pressure lines A1." Fluid lines which start from the pressure regulator R and reach the wheel brakes FL, RR in the first system and fluid lines which start from the pressure regulator R and reach the wheel brakes RL, FR in the second system are referred to as "wheel hydraulic pressure lines B." Fluid lines which start from the output hydraulic pressure lines A1 and reach the pumps 4 are referred to as "suction hydraulic pressure lines C." Fluid lines which start from the pumps 4 and reach the wheel hydraulic pressure line B are referred to as "discharge hydraulic pressure lines D." Further, fluid lines which originate from the wheel hydraulic pressure lines B and reach the corresponding suction hydraulic pressure lines C are each referred to as a release line E.

The control valve units V are valves that control transmission of hydraulic pressure between the master cylinder MC or the pumps 4 and the wheel brakes FL, RR, RL, FR (specifically, the wheel cylinders H). The control valve units V can increase, hold, or reduce the pressures of the corresponding wheel cylinders H. The control valve units V each include an inlet valve 1, an outlet valve 2, and a check valve 1*a*.

The inlet valves 1 are normally open solenoid valves that are provided between the wheel brakes FL, RR, RL, FR and the master cylinder MC, that is, are provided on the wheel hydraulic pressure lines B. The inlet valves 1 are normally open to thereby allow brake hydraulic pressures to be transmitted from the master cylinder MC to the wheel brakes FL, FR, RL, RR. Also, when the wheels W are about to be locked, the controller 100 closes the inlet valves 1, so that the inlet valves 1 cut off the transmission of the brake hydraulic pressures from the brake pedal BP to the wheel brakes FL, FR, RL, RR.

The outlet valves 2 are normally closed solenoid valves that are interposed between the wheel brakes FL, RR, RL, FR and the reservoirs 3, that is, are interposed between the wheel hydraulic pressure lines B and the release lines E. The outlet valves 2 are normally closed. When the wheels W are about to be locked, the control 100 opens the outlet valves 2, so that the outlet valves 2 release brake hydraulic pressures applied to the wheel brakes FL, FR, RL, RR to the corresponding reservoirs 3.

The check valves 1*a* are connected to the corresponding inlet valves 1 in parallel. These check valves 1*a* are each a one-way valve that allow only the flow of the brake fluid from the wheel brakes FL, FR, RL, RR towards the master cylinder MC. When the input from the brake pedal BP is released, the check valves 1*a* allow the flow of the brake fluid from the wheel brakes FL, FR, RL, RR towards the master cylinder MC even if the inlet valves 1 are closed.

The reservoirs 3 are provided in the release lines E and each has a function to suction the brake fluid pressure, which is released by opening the outlet valves 2. Also, check valves 3*a* are interposed between the reservoirs 3 and the pumps 4. The check valves 3*a* each allows only the flow of the brake fluid from the reservoir 3 towards the pump 4.

Each of the pumps 4 is interposed between the suction hydraulic pressure line C, which communicates with the output hydraulic pressure line A1, and the discharge hydraulic pressure line D, which communicates with the wheel hydraulic pressure line B. Each of the pumps 4 has a function to suction the brake fluid reserved in the reservoir 3 and discharge it into the discharge hydraulic pressure line D. Thereby, not only can the brake fluid which is suctioned by the reservoir 3 be returned to the master cylinder MC, but also a brake hydraulic pressure can be generated so as to generate braking forces acting on the wheel brakes FL, RR, RL, FR even if the driver does not depress the brake pedal BP.

It is noted that a discharge amount of the brake fluid from the pumps 4 depends on the revolution speed of the motor 9. For example, the discharge amount of the brake fluid from the motors 4 increases as the revolution speed of the motor 9 increases.

The orifices 5*a* attenuate pulsation of pressures of the brake fluid discharged from the pumps 4 and pulsation generated by operations of the pressure regulators R, which will be described later.

The pressure regulators R are normally open to thereby allow the brake fluid to flow from the output hydraulic pressure lines A1 to the wheel hydraulic pressure lines B. Also, when increasing the pressures at the wheel cylinders H by means of the brake fluid pressures generated by the pumps 4, the pressure regulators R controls the pressures in the discharge hydraulic pressure lines D, the wheel hydraulic pressure lines B, and the wheel cylinders H so as to become equal to or smaller than a predetermined value. Each of the pressure regulators R includes a selector valve 6 and a check valve 6*a*.

The selector valves 6 are normally open linear solenoid valves that are interposed between the output hydraulic pressure lines A1, which communicate with the master cylinder MC, and the wheel hydraulic pressure lines B, which communicate with the corresponding wheel brakes FL, FR, RL, RR. Although not shown in detail, a valve body of the selector valve 6 is biased toward the wheel hydraulic pressure lines B and the wheel cylinders H by an electromagnetic force which corresponds to an electric current supplied thereto. If the pressures in the wheel brake hydraulic lines B become higher by a predetermined value (which depends on the supplied electric current) or more than the pressure in the output hydraulic pressure line A1, the pressures in the wheel hydraulic pressure lines B are regulated to a predetermined pressure by releasing the brake fluid from the wheel hydraulic pressure lines B to the output hydraulic pressure line A1 via the pressure regulator R.

The check valves 6a are connected to the corresponding selector valves 6 in parallel. Each of the check valves 6a is a one-way valve which allows the brake fluid to flow from the output hydraulic pressure line A1 to the wheel hydraulic pressure lines B.

The suction valves 7 are normally closed solenoid valves and switch a state of the corresponding suction hydraulic pressure lines C between an open state and a cut-off state. If the brake hydraulic pressure should be applied to the wheel brakes FL, FR, RL, RR in such a state where the selector valves 6 is closed, that is, the driver does not depress the brake pedal BP, the suction valves 7 are released (opened) by the controller 100.

The pressure sensor 8 detects a brake fluid pressure in the output hydraulic pressure line A1 of the second system, that is, detects a master cylinder pressure. The detection by the pressure sensor 8 is input to the controller 100.

Figure 3:
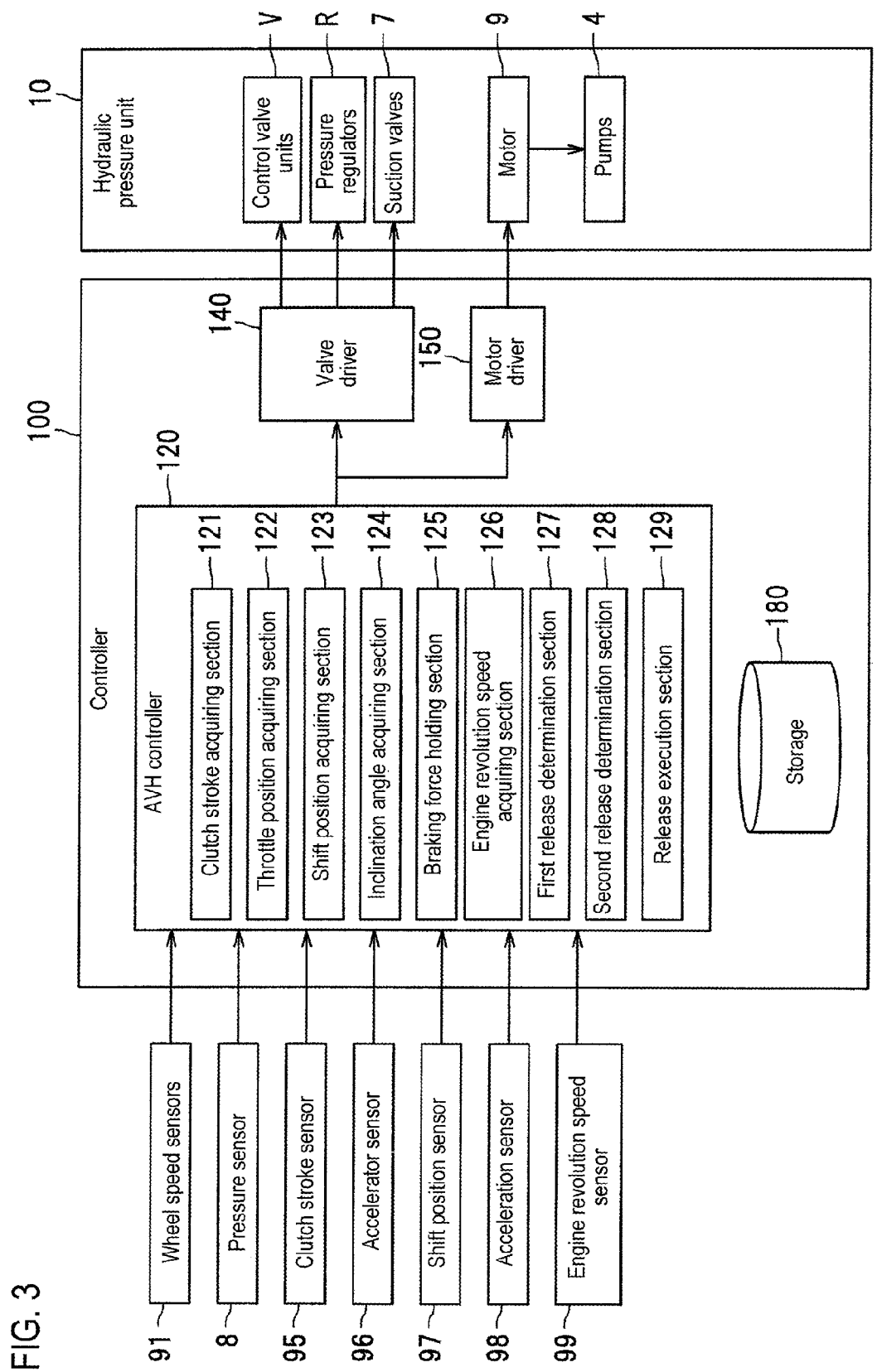
FIG. 3 is a block diagram showing the configuration of a controller.

Next, the controller 100 will be described in detail. As shown in FIG. 3, the controller 100 controls opening and closing of the control valve units V, the selector valves 6 (the pressure regulators R), and the suction valves 7 in the hydraulic pressure unit 10 and the operations of the control valve units V in the hydraulic pressure unit 10 based on signals input from the pressure sensor 8, the wheel speed sensors 91, the clutch stroke sensor 95, the accelerator sensor 96, the shift position sensor 97, the acceleration sensor 98, and the engine revolution speed sensor 99, so as to control the operations of the wheel brakes FL, RR, RL, FR (executes the AVH control). The controller 100 includes an AVH control section 120, a valve driver 140, a motor driver 150, and a storage 180. The storage 180 stores constants that are set in advance, values detected by the respective sensors, and values calculated by the respective sections as required. Although not described in detail, the controller 100 has an anti-locking braking control section that executes an anti-locking braking control, a skid suppression control section that executes a skid suppression control, and the like.

The AVH control section 120 has a clutch stroke acquiring section 121, a throttle position acquiring section 122, a shift position acquiring section 123, an inclination angle acquiring section 124, a braking force holding section 125, an engine revolution speed acquiring section 126, a first release determination section 127, a second release determination section 128, and a release execution section 129.

The clutch stroke acquiring section 121 acquires a clutch stroke signal from the clutch stroke sensor 95.

The throttle position acquiring section 122 acquires a throttle position from the accelerator sensor 96.

The shift position acquiring section 123 acquires a position of the gear shift from the shift position sensor 97. The shift position acquiring section 123 determines, based on the acquired shift position signal, as to whether the gear shift is in any of forward gear positions or a reverse gear position.

Figure 7A:
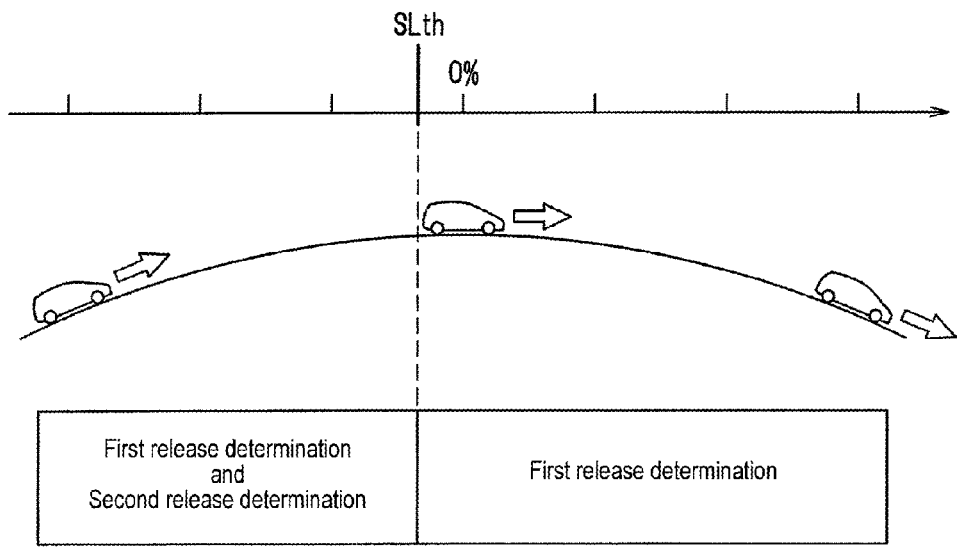
FIG. 7A is a diagram illustrating as to how to switch between release determination methods when the vehicle is traveling forward.
Figure 7B:
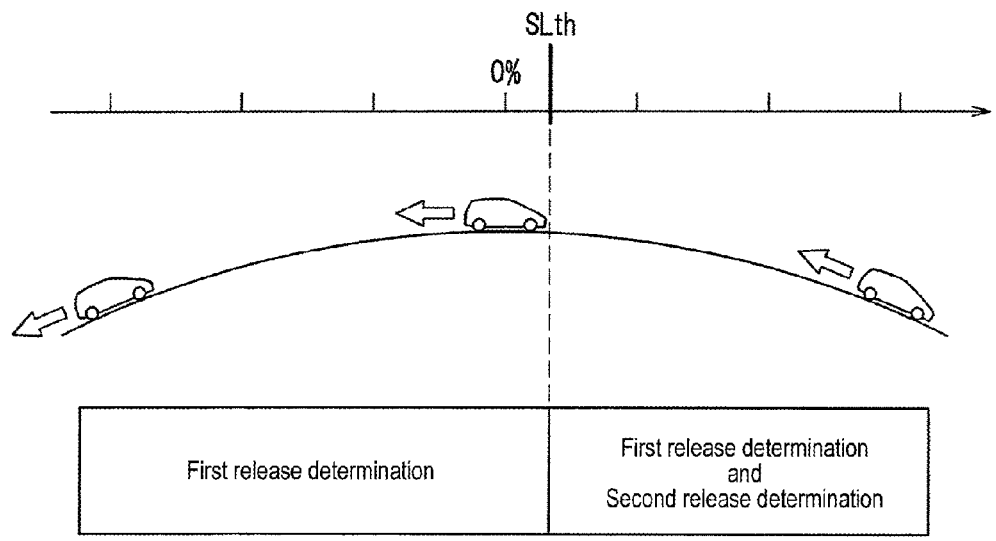
FIG. 7B is a diagram illustrating as to how to switch between the release determination methods when the vehicle is traveling rearward.

The inclination angle acquiring section 124 calculates an inclination angle of the road surface based on a signal from the acceleration sensor 98 and signals from the wheel speed sensors 91. Here, the inclination angle is calculated in percent as shown in FIGS. 7A and 7B. It is assumed that forward tilt of the vehicle CR corresponds to positive inclination angles.

The engine revolution speed acquiring section 126 acquires an actual engine revolution speed from the engine revolution speed sensor 99.

Respective parameters acquired by these acquiring sections 121 to 126 are stored as required in the storage 180.

The braking force holding section 125 holds braking forces imparted to the wheel brakes FL, RR, RL, FR of the vehicle CR which is at a halt. With regard to conditions under which the braking force holding section 125 is enabled to start holding of braking forces, a known configuration may be adopted, and the configuration in this regard is not particularly limited.

Figure 4A:
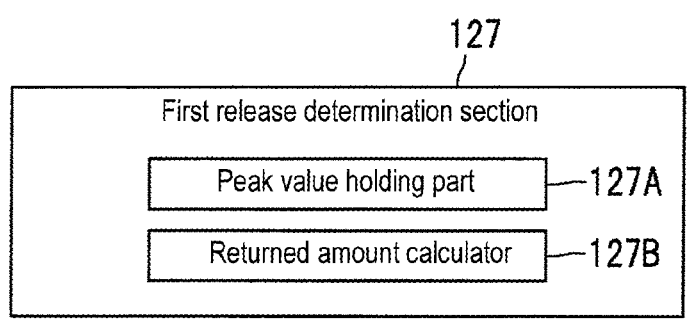
FIG. 4A is a block diagram of a first release determination section.

The first release determination section 127 determines as to whether or not the braking force held by the braking force holding section 125 should be released, based on the clutch stroke acquired by the clutch stroke acquiring section 121. As shown in FIG. 4A, the first release determination section 127 has a peak value holding part 127A and a returned amount calculator 127B.

The peak value holding part 127A holds a peak value of the clutch stroke when the gear shift is in any of the non-neutral gear positions during the AVH control. The holding of the peak value is carried out by comparing a peak value which was held in a previous holding process with a clutch stroke detected in a current holding process and replacing the previous peak value with the current peak value if the clutch stroke detected in the current holding process is larger than the previous peak value. If the AVH control is terminated or if the gear shift is in the neural position, the peak value is reset.

The returned amount calculator 127B calculates a returned amount by which the clutch pedal CP is returned from a position where the peak value is taken.

If a time at which the returned amount calculated by the returned amount calculator 127B exceeds a release determination threshold value RLth (which is an example of a first threshold value) exceeds a timer threshold value TMth (which is an example of a second threshold value), the first release determination section 127 determines that the holding of the braking force should be released. If the first release determination section 127 determines that the holding of the braking force should be released, a first release determination flag FL1 is set to be on. If the first release determination section 127 does not determine that the holding of the braking force should be released, the first release determination flag FL1 is set to be off.

Figure 5:
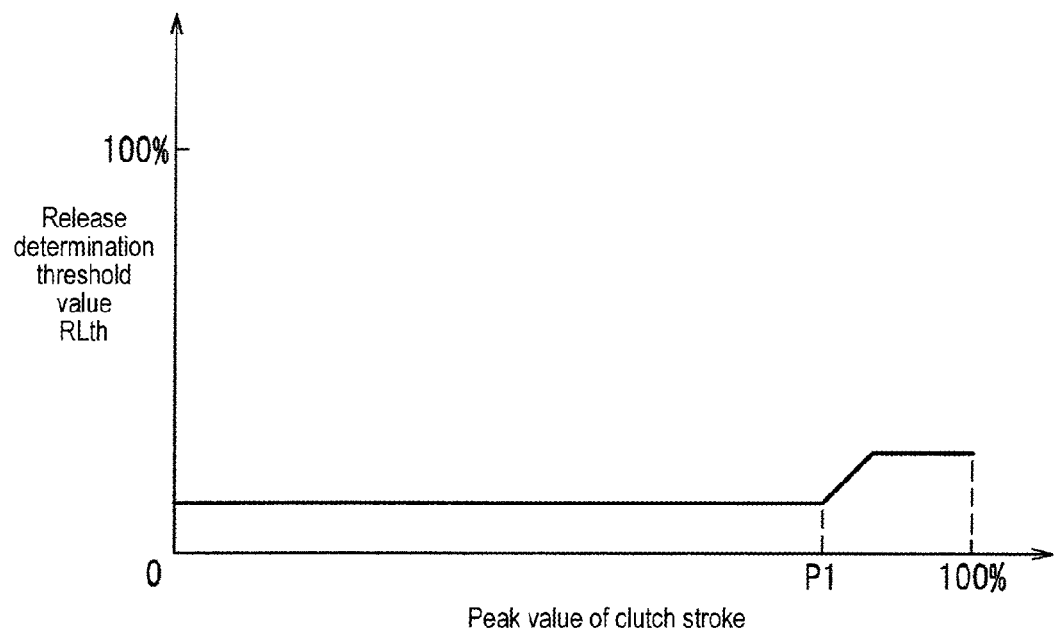
FIG. 5 is a diagram showing a relationship between a peak value of a clutch stroke and a release determination threshold value.

Here, as shown in FIG. 5, the release determination threshold value RLth for a case where the peak value of the clutch stroke is larger than a predetermined value P1 is larger than that for a case where the peak value is equal to or smaller than the predetermined value P1. This is because there is a tendency that if the driver depresses the clutch pedal CP substantially fully, then, the driver cannot hold the clutch pedal CP in the substantially fully depressed state but returns the clutch pedal CP somewhat even if the driver has no intention to engage the clutch.

Also, the release determination threshold value RLth is set to a small value with respect to the entire clutch stroke. This is because in this embodiment, the release determination threshold value RLth is a threshold value based on which it is determined as to whether or not the driver "starts to return" the clutch pedal CP.

Figure 4B:
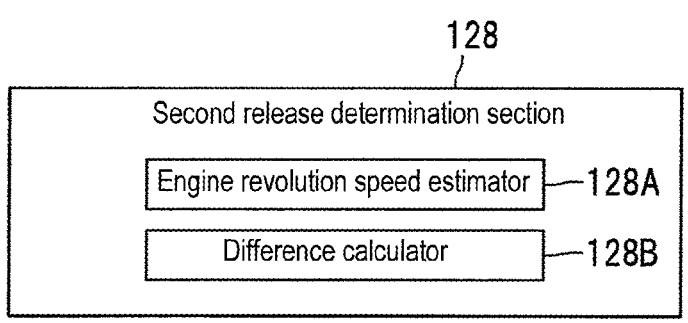
FIG. 4B is a block diagram of a second release determination section.

The second release determination section 128 has, as shown in FIG. 4B, an engine revolution speed estimator 128A and a difference calculator 128B.

Figure 6:
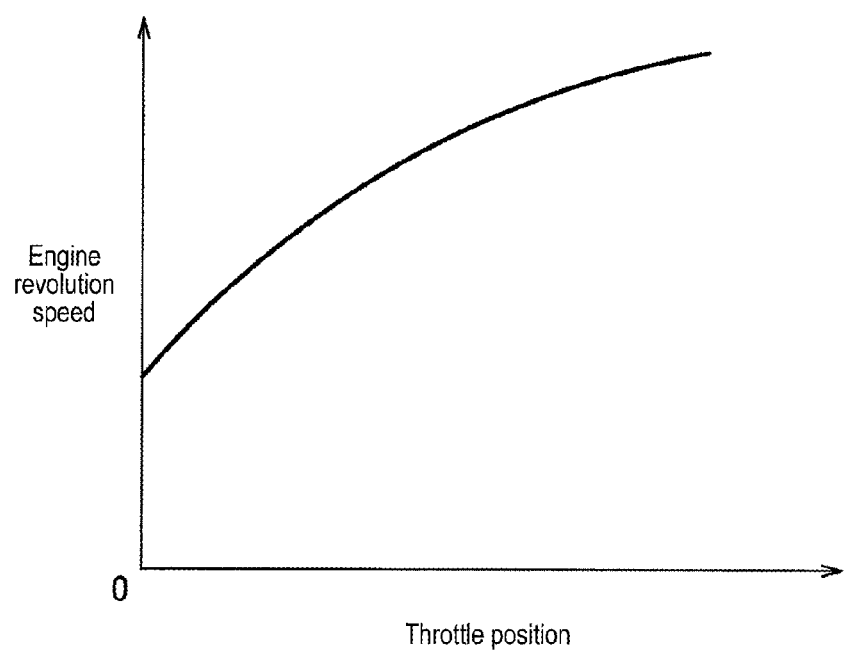
FIG. 6 is a graph showing a relationship between a throttle position and an engine revolution speed in a non-load state.

The engine revolution speed estimator 128A estimates an engine revolution speed (obtains an estimated engine revolution speed) in a no-load state, based on the throttle position acquired by the throttle position acquiring section 122. The throttle position and the engine revolution speed in the no-load state has a relationship shown in FIG. 6. A table indicating this relationship is stored in the storage 180 in advance.

The difference calculator 128B calculates a difference between the actual engine revolution speed acquired by the engine revolution speed acquiring section 126 and the engine revolution speed in the no-load state which is estimated by the engine revolution speed estimator 128A. This difference means a magnitude of a load applied to the engine. A larger difference means that the clutch is more likely to be engaged. The calculated difference is stored in the storage 180 as required.

The second release determination section 128 determines based on the difference calculated by the difference calculator 128B as to whether or not the braking force held by the braking force holding section 125 should be released. If the calculated difference exceeds a predetermined release reference value ΔNth, the second release determination section 128 determines that the braking force held by the braking force holding section 125 should be released. If the second release determination section 128 determines that the holding of the braking force should be released, a second release determination flag FL2 is set to be on. If the second release determination section 128 does not determine that the holding of the braking force should be released, the second release determination flag FL2 is set to be off.

The release execution section 129 executes the release of the braking force held by the braking force holding section 125 based on the determination result by the first release determination section 127 or the both determination results by the first release determination section 127 and the second release determination section 128. Specifically, as shown in FIGS. 7A and 7B, if the release execution section 129 determines based on the inclination angle calculated by the inclination angle acquiring sensor 124 that the vehicle CR is about to start on an uphill road and if both the first release determination section 127 and the second release determination section 128 determine that the holding of the braking force should be released, the release execution section 129 releases the holding of the braking force. If the release execution section 129 determines based on the calculated inclination angle that the vehicle CR is about to start on a flat road or a downhill road and if the first release determination 127 determines that the holding of the braking force should be released, the release execution section 129 releases the holding of the braking force. The reason for these operations is as follows. If the vehicle CR starts on the uphill road, it is general practice that the driver engages the clutch while depressing the accelerator AP. Therefore, the holding of the braking force can be released at a more appropriate timing by taking the determination result by the second release determination section 128 as well as the determination result of the first release determination section 127 into consideration. On the other hand, if the vehicle CR starts on the flat road or the downhill, some of drivers engage the clutch without depressing the accelerator AP. Therefore, it is possible to suppress cases where the holding of the braking force is released at an erroneous timing by releasing the holding of the braking force if the first release determination section 127 determines that the holding of the braking force should be released without taking into consideration the determination which the second release determination section 128 makes based on the throttle position.

Here, a threshold value (inclination angle determination threshold value SLth) to discriminate the uphill road from the flat road may be set to 0 percent in the inclination angle. However, as shown in FIGS. 7A and 7B, it is preferable that the threshold value SLth be set to an inclination angle corresponding to a position slightly before 0% in the inclination angle in terms of the vehicle traveling direction. Namely, it is preferable that if information acquired by the shift position acquiring section 123 indicates that the gear shift is in any of the forward gear positions, the release execution section 129 sets the inclination angle determination threshold value SLth to an inclination angle (one example of third threshold value) which deviates towards a rearward tilting side from a horizontal position and that if the inclination angle calculated by the inclination angle acquiring section 124 is on a forward tilting side with respect to this inclination angle determination threshold value SLth, the release execution section 129 determines that the vehicle CR is about to start on the flat road or the downhill road. It is also preferable that if the acquired information indicates that the gear shift is in the reverse gear position, the release execution section 129 sets the inclination angle determination threshold value SLth to an inclination angle (another example of third threshold value) which deviates toward a forward tilting side with respect to the horizontal position and that if the calculated inclination angle is on a rearward tilting side with respect to this inclination angle determination threshold value SLth, the release execution section 129 determines that the vehicle CR is about to start on the uphill road.

With this configuration, even if there is an error in the inclination angle calculated by the inclination acquiring section 124, it is possible to determine in an ensured fashion that the vehicle is about to travel on the flat road when the vehicle is on the flat road in reality.

The valve driver 140 actually drives the control valve units V, the pressure regulators R, and the suction valves 7 according to instructions from the AVH control section 120 as well as the anti-locking braking control section and the skid suppression control section which are not shown.

The motor driver 150 has a function to drive the motor 9 according to instructions from the AVH control section 120 as well as the anti-locking braking control section and the skid suppression control section which are not shown.

The process of the AVH control executed by the vehicle brake control system A which is configured as has been described heretofore will be described.

Figure 8:
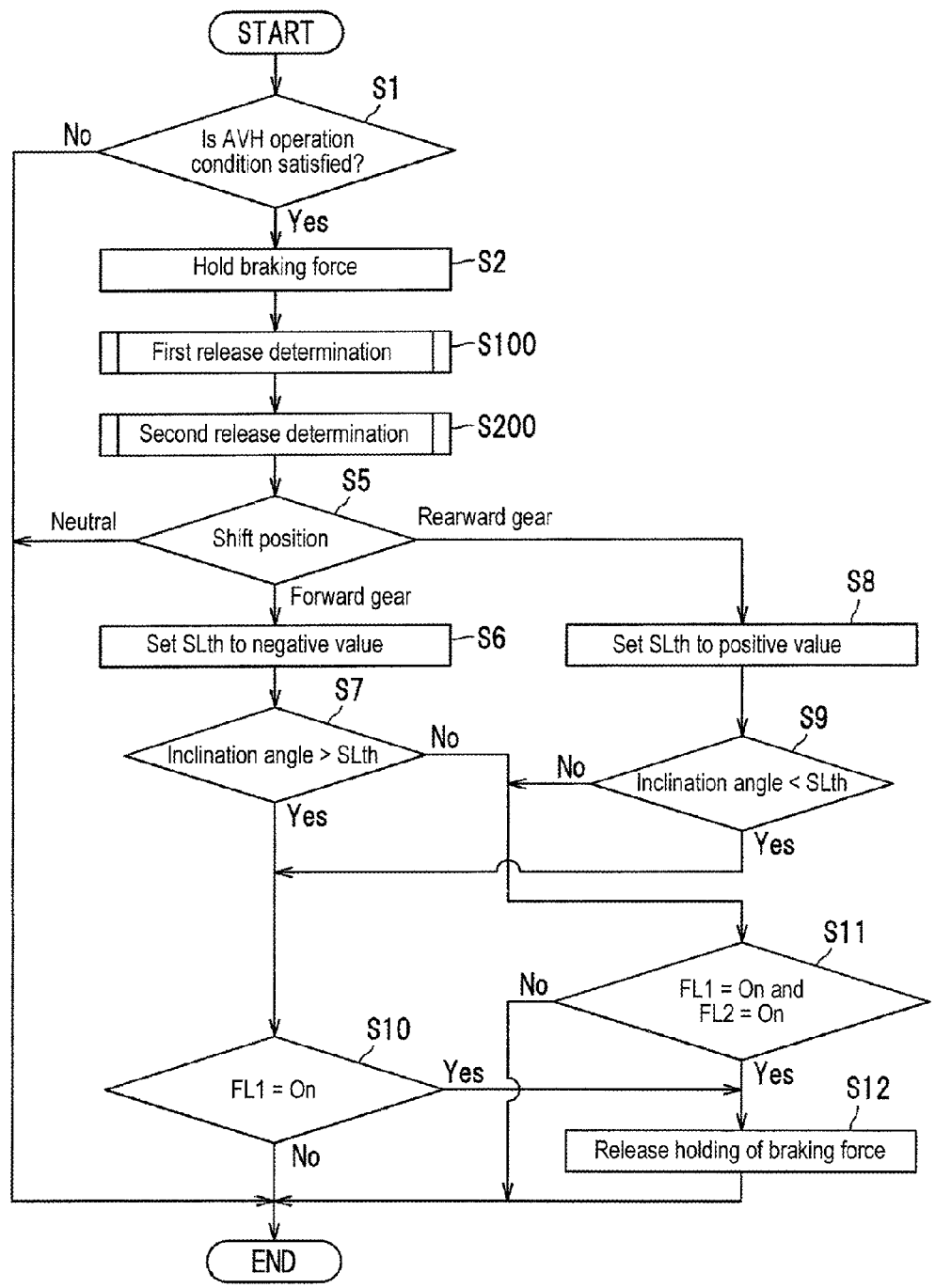
FIG. 8 is a flowchart illustrating an overall process of an AVH control.

A process shown in FIG. 8 is performed repeatedly. As shown in FIG. 8, if a predetermined AVH operating condition is not satisfied (S1, No), the AVH control section 120 ends the process, whereas if the predetermined AVH operating condition is satisfied (S1, Yes), the AVH control section 120 holds a braking force (S2).

Then, after having held the braking force, the AVH control section 120 makes a first release determination by the first release determination section 127 (S100). Although the first release determination will be described in detail later, if the first release determination section 127 determines that the holding of the braking force should be released, the first release determination flag FL1 is set to be on, whereas if the first release determination section 127 does not determine that the holding of the braking force should be released, the flag FL1 is set to be off.

Next, the AVH control section 120 makes a second release determination by the second release determination section 128 (S200). Although the second release determination will be described in detail later, if the second release determination section 128 determines that the holding of the braking force should be released, the second release determination flag FL2 is set to be on, whereas if the second release determination section 128 does not determine that the holding of the braking force should be released, the flag FL2 is set to be off.

Next, the release execution section 129 determines as to where the gear shift is in. If the release execution section 129 determines that the gear shift is in the neutral position (S5, neutral), the process is ended because there is no possibility that the vehicle CR starts. On the other hand, if the release execution section 129 determines that the gear shift is in any of the forward gear positions (S5, forward gear), the release execution section 129 sets the inclination angle determination threshold value SLth to a negative value (S6). If the inclination angle calculated by the inclination angle acquiring section 124 is larger than the inclination angle determination threshold value SLth (S7, Yes), the release execution section 129 determines that the vehicle CR is about to start on the flat road or the downhill road, and therefore, the process proceeds to step S10. On the other hand, if the calculated inclination angle is equal to or smaller than the inclination angle determination threshold value SLth (S7, No), the release execution section 129 determines that the vehicle CR is about to start on the uphill road, and therefore, the process proceeds to step S11. Also, if the release execution section 129 determines that the gear shift is in the reverse gear position (S5, reverse gear), the release execution section 129 sets the inclination angle determination threshold value SLth to a positive value (S8). If the calculated inclination angle is smaller than the inclination angle determination threshold value SLth (S9, Yes), the release execution section 129 determines that the vehicle CR is about to start on the flat road or the downhill road, and therefore, the process proceeds to step S10. Also, if the calculated inclination angle is equal to or larger than the inclination angle determination threshold value SLth (S9, No), the release execution section 129 determines that the vehicle CR is about to start on the uphill road, and therefore, the process proceeds to step S11.

In step S10, the release execution section 129 determines as to whether or not the first release determination flag FL1 is on. If the release execution section 129 determines that the flag FL1 is on (S10, Yes), the release execution section 129 releases the holding of the braking force (S12) and ends the process. On the other hand, if the release execution section 129 determines that the flag FL1 is off (S10, No), the release execution section 129 ends the process without releasing the holding of the braking force.

Also, in step S11, the release execution section 129 determines as to whether or not the first release determination flag FL1 is on and whether or not the second release determination flag FL2 is on. If the release execution section 129 determines that both the flags FL1, FL2 are on (S11, Yes), the release execution section 129 releases the holding of the braking force (S12) and ends the process. On the other hand, if the release execution section 129 determines that either or both of the first release determination flag FL1 and the second release determination flag FL2 is off (S11, No), the release execution section 129 ends the process without releasing the holding of the braking force.

Next, a first release determination process will be described.

Figure 9:
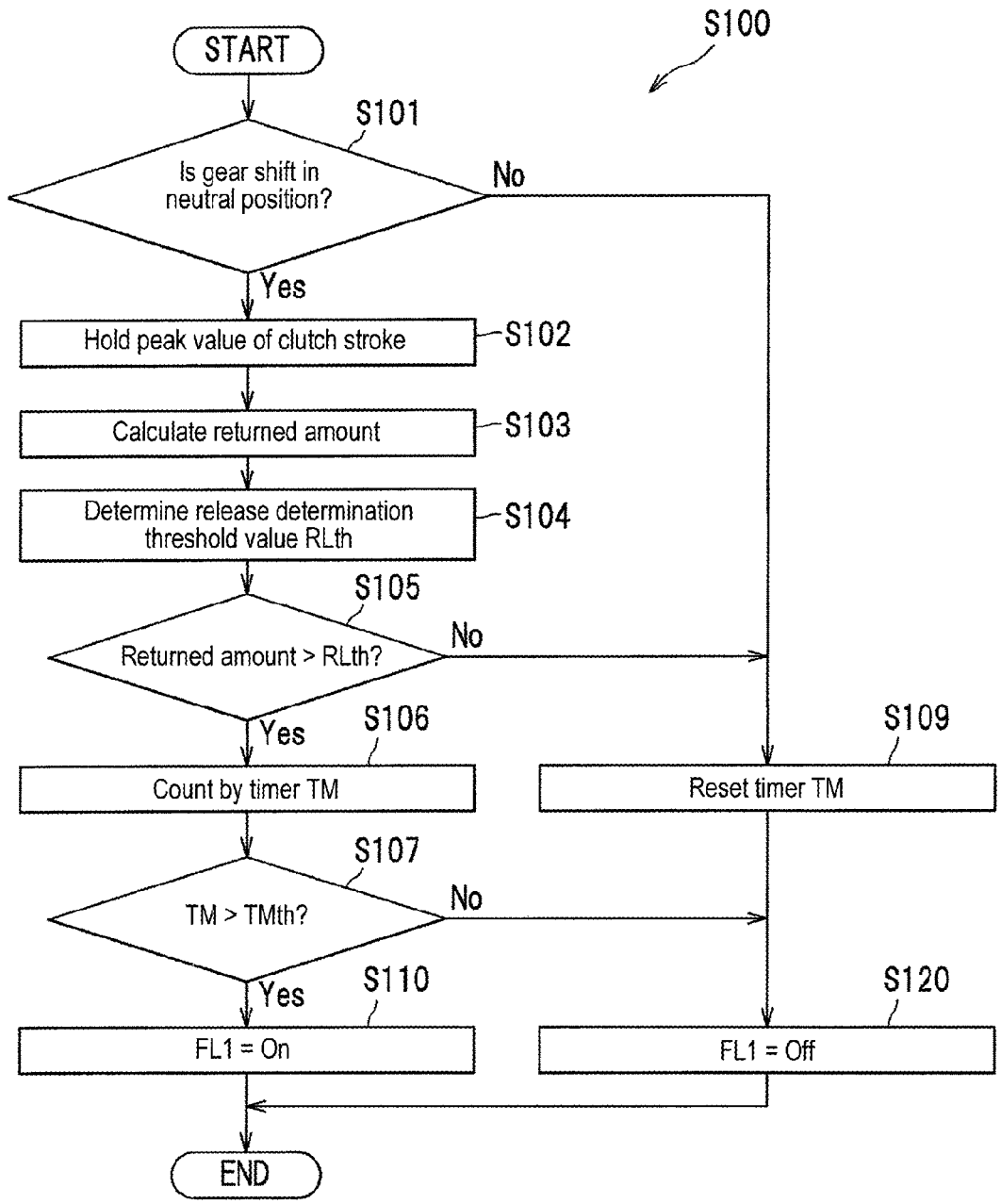
FIG. 9 is a flowchart illustrating a process of a first release determination.

As shown in FIG. 9, the first release determination section 127 determines as to whether or not the gear shift is in any of the non-neutral gear positions (whether or not the gear shift is in a gear position other than the neutral position). If the first release determination section 127 determines that the gear shift is in the neutral position (S101, No), there is no possibility that the vehicle starts. Therefore, the first release determination section 127 resets the timer TM (S109) and sets the first release determination flag FL1 to be off (S120). On the other hand, if the first release determination section 127 determines that the gear shift is in any of the gear positions other than the neutral position (S101, Yes), the peak value holding part 127A holds the peak value of the clutch stroke (S102).

Next, the returned amount calculator 127B calculates a returned amount of the clutch by calculating a difference between the held peak value and a current value of the clutch stroke (S103). Then, the first release determination section 127 determines the release determination threshold value RLth based on the peak value (S104) and determines as to whether or not the returned amount of the clutch is larger than the release determination threshold value RLth. If the returned amount of the clutch is equal to or smaller than the release determination threshold value RLth (S105, No), the process proceeding to step S109, and the first release determination section 127 resets the timer TM and sets the first release determination flag FL1 to be off (S120).

On the other hand, if the returned amount of the clutch is larger than the release determination threshold value RLth (S105, Yes), the first release determination section 127 causes the timer TM to count up (S106). Then, the first release determination section 127 determines as to whether or not a value of the timer TM is larger than the timer threshold value TMth. If the value of the timer TM is equal to or smaller than the timer threshold value TMth (S107, No), the first release determination section 127 sets the first release determination flag FL1 to be off (S120). On the other hand, if the value of the timer TM is larger than the timer threshold value TMth (S107, Yes), the first release determination section 127 sets the first release determination flag FL1 to be on (S110).

Next, a second release determination process will be described.

Figure 10:
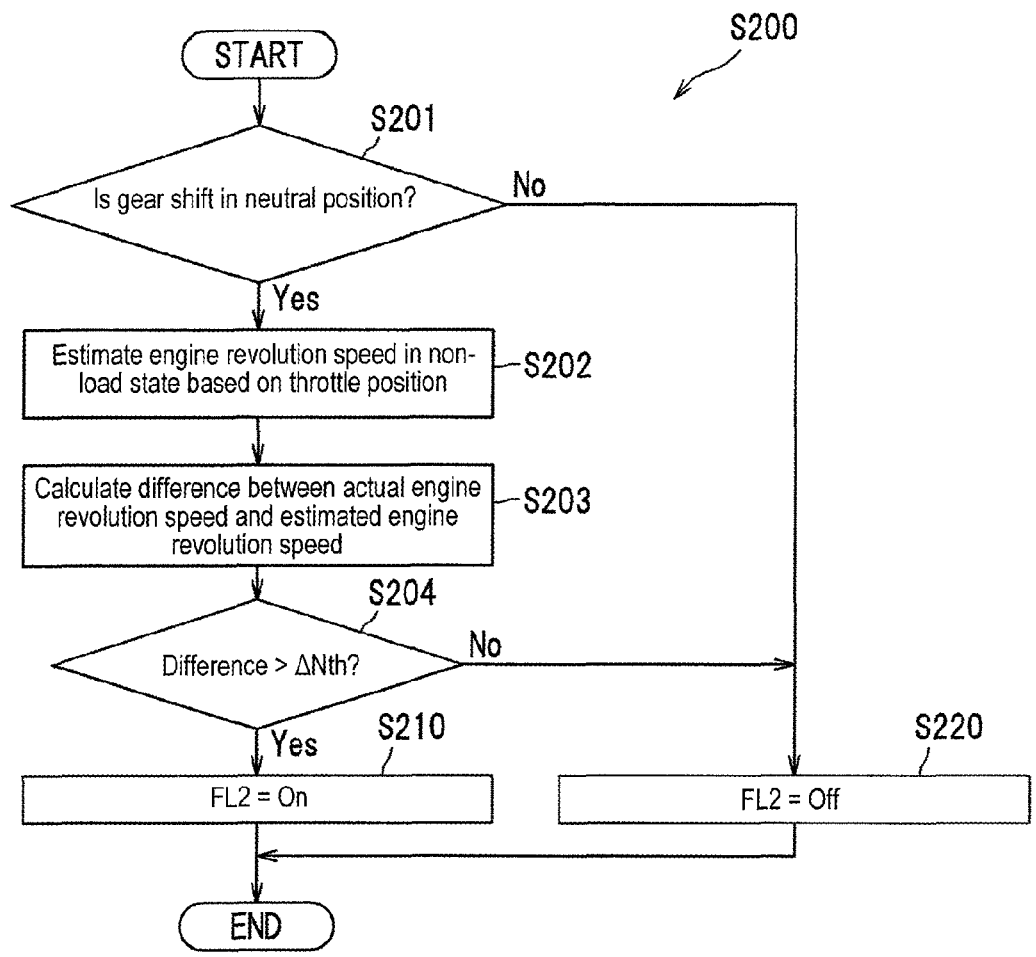
FIG. 10 is a flowchart illustrating a process of a second release determination.
Figure 11A:
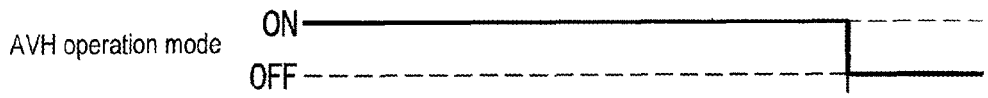
FIGS. 11A to 11G are time charts illustrating releasing holding of a braking force by using the first release determination section.
Figure 11B:
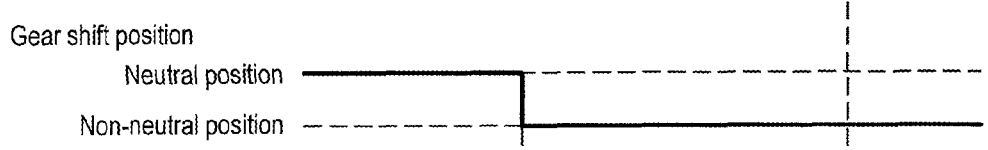
Figure 11C:
Figure 11D:
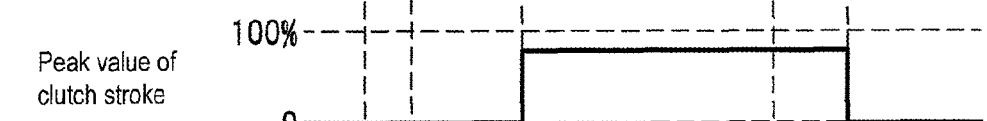
Figure 11E:
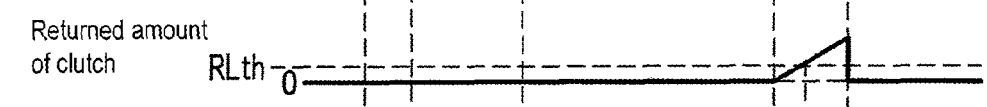
Figure 11F:
Figure 11G:
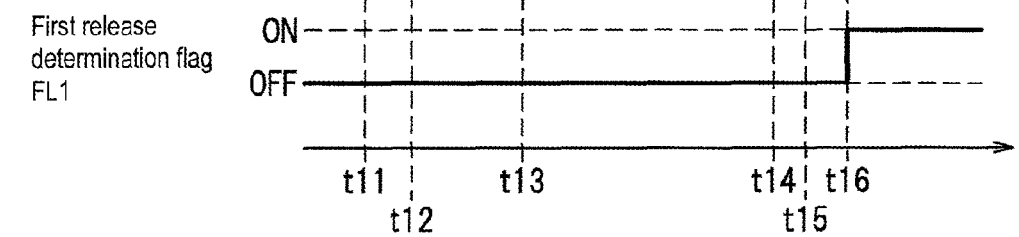

As shown in FIG. 10, the second release determination section 128 determines as to whether or not the gear shift is in any of the non-neutral gear positions. If the second release determination section 128 determines that the gear shift is in the neutral position (S201, No), there is no possibility that the vehicle CR starts. Therefore, the second release determination section 128 sets the second release determination flag FL2 to be off (S220).

If the second release determination section 128 determines that the gear shift is in any of the non-neutral gear positions (S201, Yes), the engine revolution speed estimator 128A estimates an estimated engine revolution speed in the no-load state based on the throttle position (S202). Then, the difference calculator 128B calculates a difference between the actual engine revolution speed and the estimated engine revolution speed (S203).

Next, the second release determination section 128 determines as to whether or not the calculated difference is larger than the release reference value $\Delta Nth$. If the second release detection section 128 determines that the difference is equal to or smaller than the release reference value $\Delta Nth$ (S204, No), the second release determination section 128 sets the second release determination flag FL2 to be off (S220). On the other hand, if the second release determination section 128 determines that the difference is larger than the release reference value $\Delta Nth$, the second release determination section 128 sets the second release determination flag FL2 to be on (S210).

Changes in parameters when the AVH control is executed in the vehicle CR through the processes described above will be described. It is noted that in the following description, the first release determination process and the second release determination process will be described separately for the sake of simple description.

Firstly, referring to FIGS. 11A to 11G, a case will be described where it is determined in the first release determination process that the AVH control should be released (for example, in the case of the downhill road). In an example shown in FIGS. 11A to 11G, after the AVH operation mode is on due to the AVH operating condition being satisfied, the driver depresses the clutch pedal CP (from time t11 to time t12) and shifts a shift lever from the neutral position to a non-neutral gear position (for example, a low gear position) (at time t13).

Here, since the gear shift is in the non-neutral gear position, it is started to hold the peak value of the clutch stroke (from time t13). Then, when the driver gradually returns the clutch pedal CP on and after time t14, the returned amount of the clutch increases gradually (from time t14 to time t15), and the timer TM starts counting from a point in time when the returned amount of the clutch exceeds the RLth (from time t15 to time t16). Then, the first release determination flag FL1 is set to be on at a point in time when the value of the timer TM exceeds the timer threshold value TMth (time t16).

In this way, in the first release determination, it is possible to estimate that the vehicle CR starts based on the fact that a predetermined period of time has elapsed since the clutch pedal CP is started to be returned and to determine that the holding of the braking force should be released.

Next, referring to FIGS. 12A to 12G, a case will be described where it is determined in the second release determination process that the AVH control should be released (for example, in the case of the uphill road). Although nothing regarding the first release determination is shown in FIGS. 12A to 12G, it is assumed that the first release determination flag FL1 is set to be on earlier than time t23.

In an example shown in FIGS. 12A to 12G, after the AVH operation mode is on due to the AVH operating condition being satisfied, the driver depresses the clutch pedal CP (at time t21) and shifts the shift lever from the neutral position to a non-neutral gear position (for example, a low gear position) (at time t22). Thereafter, the driver gradually depresses the accelerator AP (on and after time t23) and returns the clutch pedal CP (from time t24 to time t26).

Figure 12A:
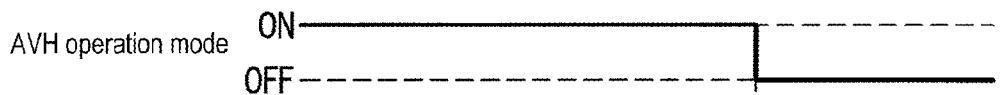
FIGS. 12A to 12G are time charts illustrating releasing the holding of the braking force by using the second release determination section.
Figure 12B:
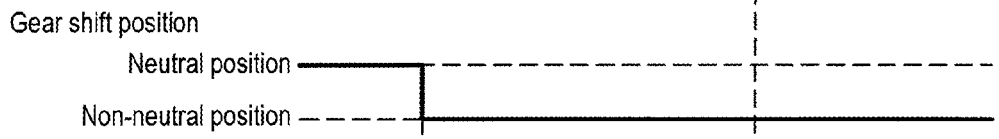
Figure 12C:
Figure 12D:
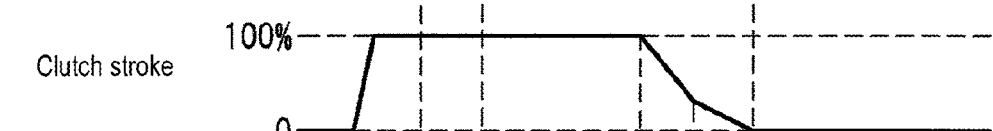
Figure 12E:
Figure 12F:
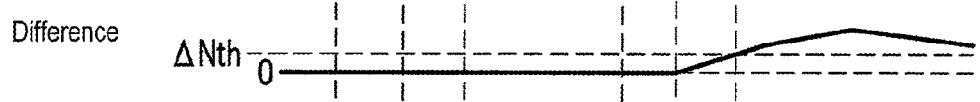
Figure 12G:
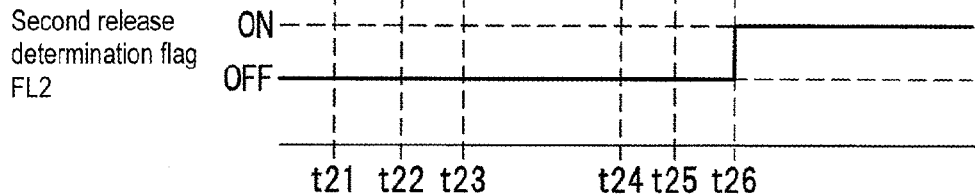

When the clutch starts to be engaged at time t25, the actual engine revolution speed indicated by a broken line in FIG. 12E lowers with respect to the estimated engine revolution speed indicated by a solid line in FIG. 12E, and the difference therebetween increases gradually. Then, when the difference becomes larger than ANth (at time t26), the second release determination flag FL2 is set to be on.

In this way, in the second release determination, it is possible to estimate that the vehicle CR starts based on the change in engine revolution speed after the accelerator AP has been depressed and to determine that the holding of the braking force should be released.

According to the vehicle brake control system A of this embodiment, the determination made by the first release determination section 127 as to whether or not the holding of the braking force should be released makes it possible to estimate the engagement of the clutch without changing the set threshold value and to properly release the braking force during the AVH control. Also, on the uphill road, the holding of the braking force is released if it is determined that the holding of the braking force should be released not only in the first release determination which is made based on the depression of the clutch pedal CP but also in the second release determination which is made based on the depression of the accelerator AP, and therefore. Therefore, the holding of the braking force can be released at a more appropriate timing. On the other hand, on the flat road or the downhill road, the holding of the braking force is released based only on the first release determination without the second release determination being taken into consideration. Therefore, the holding of the braking force can be released at an appropriate timing without being affected by different ways of driver's operation of the vehicle in one of which the driver engages the clutch without depressing the accelerator AP.

Also, in the vehicle brake control system A of the embodiment, the inclination angle determination threshold value SLth is set to the different values for the case where the vehicle travels forward and the case where the vehicle travels reversely. Thereby, it can be determined in an ensured fashion that the vehicle is about to start on the flat road when the vehicle is on the flat road in reality. Therefore, even if there is an error in the inclination angle calculated by the inclination angle acquiring section 124, the second release determination less affect the determination on the flat road.

Further, in the vehicle brake control system A, if the peak value of the clutch stroke is larger than the predetermined value P1, the first threshold value is set to be larger than that for the case where the peak value of the clutch stroke is equal to or smaller than the predetermined value P1. Therefore, it is possible to reduce the possibility that the holding of the braking force is erroneously released when the driver slightly returns the clutch pedal CP after the driver has substantially fully depressed it.

The embodiments of the invention have been described heretofore. However, it should be noted that the invention is not limited thereto. The specific configurations may be modified as required so long as the modifications don't depart from the spirit and scope of the invention.

In the embodiment, not only the first release determination section 127 but also the second release determination section 128 is provided. However, it may determined only by the first release determination section 127 as to whether or not the holding of the braking force should be released and then, the holding of the braking force may be released.

In the embodiment, if the time (the timer TM) during which the returned amount exceeds the release determination threshold value RLth exceeds the timer threshold value TMth, the first release determination section 127 determines that the holding of the braking force should be released. However, it may be determined that the holding of the braking force should be released if the returned amount exceeds the release determination threshold value RLth. In this case, the release determination threshold value RLth may be set to a value close to an extra depression amount by which the clutch pedal CP is depressed additionally from the clutch engagement position.

In the embodiment, it is described that the brake hydraulic pressure provides the braking force. However, the motor may directly and mechanically drive the braking force without using the hydraulic pressure.

What is claimed is:
1. A vehicle brake control system comprising:
a stroke acquiring section that acquires a clutch stroke of a vehicle;
a braking force holding section that holds a braking force imparted to a wheel brake of the vehicle which is at a halt;
a first release determination section that includes
a peak value holding part that holds a peak value of the clutch stroke acquired by the stroke acquiring section, and a returned amount calculator that calculates a returned amount by which a clutch is returned from the peak value of the clutch stroke, the first release determination section determining as to whether or not the braking force held by the braking force holding section should be released, based on the returned amount; and a release execution section that releases the braking force held by the braking force holding section on condition that the first release determination section determines that the holding of the braking force should be released.

2. The vehicle brake control system according to claim 1, wherein if a time during which the returned amount exceeds a first threshold value exceeds a second threshold value, the first release determination section determines the held braking force should be released.

3. The vehicle brake control system according to claim 1, further comprising:

a second release determination section that determines as to whether or not the braking force held by the braking force holding section based on a difference between an actual engine revolution speed and an engine revolution speed in a non-load state which is estimated in accordance with a throttle position, wherein if the difference exceeds a predetermined release reference value, the second release determination section determines that the held braking force should be released; and an inclination angle acquiring section that acquires an inclination angle of a road surface, wherein if the release execution section determines based on the inclination angle acquired by the inclination angle acquiring section that the vehicle is about to start on an uphill road and if both of the first release determination section and the second release determination section determine that the held braking force should be released, the release execution section releases the held braking force, and if the release execution section determines based on the acquired inclination angle that the vehicle is about to start on a flat road or a downhill road and if the first release determination section determines that the held braking force should be released, the release execution section releases the held braking force.

4. The vehicle brake control system according to claim 1, wherein the stroke acquiring section acquires the clutch stroke signal from a clutch stroke sensor.

5. The vehicle brake control system according to claim 1, wherein the peak value holding part holds the peak value of the clutch stroke when a gear shift is in any of non-neutral gear positions during control.

6. The vehicle brake control system according to claim 1, further comprising a second release determination section which determines, based on a difference calculated by a difference calculator, as to whether or not the braking force held by the braking force holding section should be released, wherein if the calculated difference exceeds a predetermined release reference value, the second release determination section determines that the braking force held by the braking force holding section should be released, if the second release determination section determines that the holding of the braking force should be released, a second release determination flag is set to be on, and if the second release determination section does not determine that the holding of the braking force should be released, the second release determination flag is set to be off.

7. The vehicle brake control system according to claim 1, further comprising:

a second release determination section which determines, based on a difference calculated by a difference calculator, as to whether or not the braking force held by the braking force holding section should be released, wherein the release execution section executes the release of the braking force held by the braking force holding based on an inclination angle calculated by an inclination angle acquiring sensor that the vehicle is about to start on an uphill road and, if both the first release determination section and the second release determination section determine that the holding of the braking force should be released, the release execution section releases the holding of the braking force.

8. The vehicle brake control system according to claim 2, wherein if the peak value of the clutch pedal is larger than a predetermined value, the first threshold value is set to be larger than that for a case where the peak value of the clutch stroke is equal to or smaller than the predetermined value.

9. The vehicle brake control system according to claim 2, further comprising:

a second release determination section that determines as to whether or not the braking force held by the braking force holding section based on a difference between an actual engine revolution speed and an engine revolution speed in a non-load state which is estimated in accordance with a throttle position, wherein if the difference exceeds a predetermined release reference value, the second release determination section determines that the held braking force should be released; and an inclination angle acquiring section that acquires an inclination angle of a road surface, wherein if the release execution section determines based on the inclination angle acquired by the inclination angle acquiring section that the vehicle is about to start on an uphill road and if both of the first release determination section and the second release determination section determine that the held braking force should be released, the release execution section releases the held braking force, and if the release execution section determines based on the acquired inclination angle that the vehicle is about to start on a flat road or a downhill road and if the first release determination section determines that the held braking force should be released, the release execution section releases the held braking force.

10. The vehicle brake control system according to claim 3, further comprising:

a shift position acquiring section that acquires information as to whether a gear shift is in any of forward gear positions or a reverse gear position, wherein if the information acquired by the shift position acquiring section indicates that the gear shift is in any of the forward gear positions, the release execution section sets a third threshold value to one inclination angle which deviates towards a rearward tilting side from a horizontal position, and if the inclination angle acquired by the inclination angle acquiring section is on a forward tilting side with respect to the third threshold value, the release execution section determines that the vehicle is about to start on the flat road or the downhill road, and if the acquired information indicates that the gear shift is in the reverse gear position, the release execution section sets the third threshold value to another inclination angle which deviates toward a forward tilting side with respect to the horizontal position, and if the acquired inclination angle is on a rearward tilting side with respect to the third threshold value, the release execution section determines that the vehicle is about to start on the flat road or the downhill road.

11. The vehicle brake control system according to claim 5, wherein the holding of the peak value is carried out by comparing the peak value which was held in a previous holding process with a clutch stroke detected in a current holding process and replacing the previous peak value with a current peak value if the clutch stroke detected in the current holding process is larger than the previous peak value.

12. The vehicle brake control system according to claim 7, wherein if the release execution section determines based on the calculated inclination angle that the vehicle is about to start on a flat road or a downhill road and if the first release determination determines that the holding of the braking force should be released, the release execution section releases the holding of the braking force.

13. The vehicle brake control system according to claim 7, wherein a threshold value to discriminate the uphill road from the flat road is set to a position before 0% in the inclination angle in terms of vehicle travel.

14. The vehicle brake control system according to claim 7, wherein a threshold value to discriminate the uphill road from the flat road is set to a position 0% in the inclination angle.

15. The vehicle brake control system according to claim 8, further comprising:
a second release determination section that determines as to whether or not the braking force held by the braking force holding section based on a difference between an actual engine revolution speed and an engine revolution speed in a non-load state which is estimated in accordance with a throttle position, wherein if the difference exceeds a predetermined release reference value, the second release determination section determines that the held braking force should be released; and an inclination angle acquiring section that acquires an inclination angle of a road surface, wherein if the release execution section determines based on the inclination angle acquired by the inclination angle acquiring section that the vehicle is about to start on an uphill road and if both of the first release determination section and the second release determination section determine that the held braking force should be released, the release execution section releases the held braking force, and if the release execution section determines based on the acquired inclination angle that the vehicle is about to start on a flat road or a downhill road and if the first release detelinination section determines that the held braking force should be released, the release execution section releases the held braking force.

16. The vehicle brake control system according to claim 9, further comprising:
a shift position acquiring section that acquires information as to whether a gear shift is in any of forward gear positions or a reverse gear position, wherein if the information acquired by the shift position acquiring section indicates that the gear shift is in any of the forward gear positions, the release execution section sets a third threshold value to one inclination angle which deviates towards a rearward tilting side from a horizontal position, and if the inclination angle acquired by the inclination angle acquiring section is on a forward tilting side with respect to the third threshold value, the release execution section determines that the vehicle is about to start on the flat road or the downhill road, and if the acquired information indicates that the gear shift is in the reverse gear position, the release execution section sets the third threshold value to another inclination angle which deviates toward a forward tilting side with respect to the horizontal position, and if the acquired inclination angle is on a rearward tilting side with respect to the third threshold value, the release execution section determines that the vehicle is about to start on the flat road or the downhill road.

17. The vehicle brake control system according to claim 11, wherein if control is terminated or if a gear shift is in a neural position, the peak value is reset.

18. The vehicle brake control system according to claim 15, further comprising:
a shift position acquiring section that acquires information as to whether a gear shift is in any of forward gear positions or a reverse gear position, wherein if the information acquired by the shift position acquiring section indicates that the gear shift is in any of the forward gear positions, the release execution section sets a third threshold value to one inclination angle which deviates towards a rearward tilting side from a horizontal position, and if the inclination angle acquired by the inclination angle acquiring section is on a forward tilting side with respect to the third threshold value, the release execution section determines that the vehicle is about to start on the flat road or the downhill road, and if the acquired information indicates that the gear shift is in the reverse gear position, the release execution section sets the third threshold value to another inclination angle which deviates toward a forward tilting side with respect to the horizontal position, and if the acquired inclination angle is on a rearward tilting side with respect to the third threshold value, the release execution section determines that the vehicle is about to start on the flat road or the downhill road.

19. The vehicle brake control system according to claim 17, wherein the returned amount calculator calculates the returned amount by which a clutch pedal is returned from a position where the peak value is taken.

20. The vehicle brake control system according to claim 19, wherein
if a time at which the returned amount calculated by the returned amount calculator exceeds a release determination threshold value exceeds a timer threshold value, the first release determination section determines that the holding of the braking force should be released, if the first release determination section determines that the holding of the braking force should be released, a first release determination flag is set to be on, and if the first release determination section does not determine that the holding of the braking force should be released, the first release determination flag is set to be off.

* * * * *